United States Patent

[11] 3,584,145

[72] Inventors Cassius C. Cutler
Holmdel;
Frank W. Mounts, Colts Neck, both of, N.J.

[21] Appl. No. 786,244
[22] Filed Dec. 23, 1968
[45] Patented June 8, 1971
[73] Assignee Bell Telephone Laboratories, Incorporated
Murray Hill, Berkeley Heights, N.J.

[54] TIME DIVISION MULTIPLEXING OF VIDEO REDUNDANCY REDUCTION DATA COMPRESSORS
11 Claims, 7 Drawing Figs.

[52] U.S. Cl. 178/7.1, 179/15
[51] Int. Cl. H04n 7/12
[50] Field of Search 178/7.1, 6.8, 6 BWR, 6 PD, 50; 179/15.55, 15 BA, 15 BW, 15 AS, 15 AT; 325/38, 38.1; 343/176, 200, 204; 340/172.5

[56] References Cited

UNITED STATES PATENTS

| | | | |
|---|---|---|---|
| 2,681,385 | 6/1954 | Oliver | 178/6 BWR |
| 3,344,406 | 9/1967 | Vinal | 340/172.5 |

OTHER REFERENCES

J. E. Flood et al., " Time-Assignment Speech Interpolation in Time-Compression-Multiplex Transmission," Proc. IEE, Vol, III, No. 4, April 1964, Pages 675— 684.

*Primary Examiner*—Richard Murray
*Assistant Examiner*—Alfred H. Eddleman
*Attorneys*—R. J. Guenther and E. W. Adams, Jr.

ABSTRACT: Video signals from several sources are processed by a plurality of redundancy reduction data compressors and combined in an asynchronous time division multiplexing system. Each redundancy reduction data compressor couples to its buffer memory only those video samples which differ by an amount greater than a threshold level from the video samples previously stored in a reference frame memory. A count of the number of frames stored in the buffer memory is utilized by a control logic circuit as a first condition to determine the priority of connecting each redundancy reduction data compressor to a transmission channel. When the number of frames in each buffer memory is equal, the control logic circuit utilizes a count of the number of samples stored in the buffer memory as a second condition to determine the priority for connection to the transmission channel. Several threshold circuits are provided in each of the redundancy reduction data compressors. The particular one chosen for use by the control logic circuit depends on the use that the data compressor has made of the transmission channel.

INVENTORS C.C. CUTLER
F. W. MOUNTS

BY Daniel D. Dubosky
ATTORNEY

TIME DIVISION MULTIPLEXING OF VIDEO REDUNDANCY REDUCTION DATA COMPRESSORS

BACKGROUND OF THE INVENTION

This application relates to a time division multiplex system, and more particularly to the time division multiplexing of redundancy reduction data compressors for use with video signals.

In the copending application Ser. No. 749,770 to F. W. Mounts filed Aug. 2, 1968, a redundancy reduction data compressor is disclosed for use with video signals. In the Mounts apparatus each new sample from a video signal is compared with a stored sample from a frame memory having the same time position in the video frame. If the difference between the new sample and stored sample is greater than a threshold level, the new sample is inserted into a buffer memory to await transmission to a receiving location. In order to avoid overflow and underflow of the buffer memory, the number of samples stored in the buffer memory is utilized as a parameter in controlling the value of the threshold level.

In the copending application Ser. No. 775,460 of C. C. Cutler and F. W. Mounts Case 70-6 filed Nov. 13, 1968 and entitled "Time Assignment Video Interpolation with Redundancy Reduction," several data compressors of the type described in the above-identified sole application by Mounts are combined in an asynchronous time division multiplexing system. The buffer memory in each of the plurality of redundancy reduction data compressors is connected by way of a time division multiplexing switch to a single high capacity transmission channel. The number of samples stored in each of the buffer memories, in addition to being utilized as a control on the threshold level within each data compressor, is utilized to determine the priority which each buffer memory shall receive for connection through to the transmission channel. The buffer memory with the largest number of samples in storage is connected through to the transmission channel until its number of stored samples is reduced to a level lower than that of one of the other buffer memories. When the statistics of the video signals being processed by each of the data compressors are fairly similar in that each picture has some movement within each of the video frames, the time division multiplexing system described in the above-identified Cutler-Mounts application treats each of the video signals in a fairly equal fashion, even though each of the signals may monopolize the transmission channel for short intervals of time during which its picture contains a large amount of activity. If, however, one of the video signals has an inactive picture for an extended interval, the buffer memory corresponding to this inactive signal will accumulate very few words in storage and in addition these accumulated words will correspond to a large number of video frames. As a result, this inactive video signal will not have any samples connected to the transmission channel for an extended period of time, and an undesirable amount of delay will be introduced between the viewed scene and display corresponding to that video signal. In addition, if some of the picture elements from each video frame are necessary to the receiver for synchronization purposes, the undesirable delay introduced into an inactive signal may also lead to a loss of synchronization at the receiving location corresponding to this inactive signal.

SUMMARY OF THE INVENTION

A primary object of the present invention is to eliminate the undesirable delay which is introduced by the prior art time division multiplexing system when processing a video signal which has an inactive picture for an extended interval. This object is achieved in apparatus constructed in accordance with the present invention wherein the buffer memory in each one of a plurality of redundancy reduction data compressors utilized for processing video signals is asynchronously time division multiplexed to a transmission channel. Each buffer memory stores a sample from a video signal only when that sample differs by more than a threshold value from a corresponding previously stored sample having the same time position in a video frame. A counting means registers the number of samples stored in each buffer memory and the number of video frames to which these stored samples correspond. A control circuit causes the time division switch to connect the buffer memory having the largest number of frames in storage to the transmission channel as a first condition of priority. When all of the buffer memories have an equal number of frames in storage, the control circuit causes the transmission channel to be connected to the buffer memory with the largest number of samples in storage.

A feature of the present invention is that the control circuit is also utilized to determine the use that each data compressor has made of the transmission channel. By comparing the use that each data compressor has made with the average use of the channel by all of the data compressors, a determination can be made as to which of the video signals being processed has been monopolizing the transmission channel to the detriment of other less active video signals. This information is utilized by the control circuit to change the threshold value in those data compressors where a change would be desirable. If use by a data compressor has been greater than average, its threshold function is changed so that a greater difference is required between each new video sample and its corresponding stored sample before transmission of the new sample is warranted. On the other hand, if use by a data compressor has been less than average, its threshold function is changed so that a smaller difference is required between each new sample and its corresponding stored sample. As a result, each of the video signals are insured to have more equal use of the transmission channel.

BRIEF DESCRIPTION OF THE DRAWINGS

The invention will be more fully comprehended when the following description is read in conjunction with the drawings in which.

DETAILED DESCRIPTION

Figure 1:
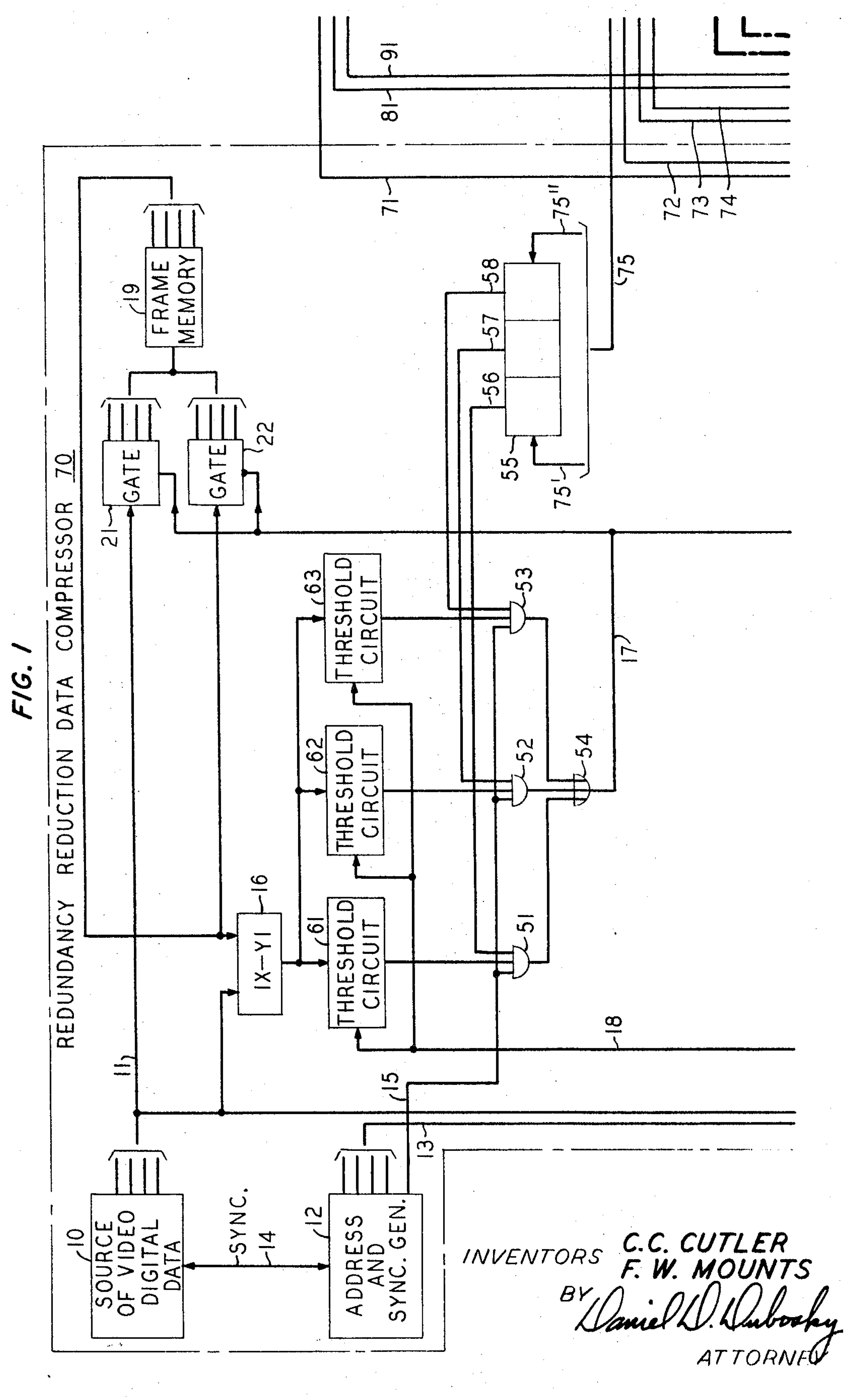
FIGS. 1, 2 and 3, when arranged in accordance with the diagram in FIG. 4, provide a schematic block diagram of one embodiment of the present invention.

In FIG. 1 of the drawings a source of video digital data 10 which includes a video camera and analog-to-digital converter provides digital words on bus 11 each one of which represents a sample of the video amplitude of the spatial point or picture element being scanned by the camera within source 10. Each line in the drawings referred to as a bus is constructed of several transmission paths, each one of which carries one bit of the digital word said to be carried by the bus. A second digital word is provided by address and sync generator 12 on bus 13 for each of the digital words provided by source 10. The address word provided on bus 13 is unique for each picture element being sampled and has a value which indicates the position of its corresponding digital word on bus 11 in the overall video frame. A synchronous coupling by way of line 14 between source 10 and generator 12 insures that the address provided on bus 13 always corresponds to the correct digital word provided on bus 11. This synchronization on line 14 may originate in either source 10 or in the address generator 12. Address and sync generator 12 also provides an energizing pulse on line 15 at a short predetermined interval after the address word has been established on bus 13.

The digital word on bus 11 corresponding to the most recent sampling of a picture element in source 10 is coupled to one input of a two input difference circuit 16. The other input of difference circuit 16 is connected to the output of a frame memory 19 which provides a digital word corresponding to the amplitude of the same picture element in a previous video frame. Difference circuit 16 develops the absolute magnitude of the difference between the digital words presented at its two inputs and provides this absolute magnitude of the difference to one input of each of three threshold circuits 61, 62 and 63. Each of the threshold circuits 61, 62 and 63 has a second input which is connected to receive a digital word on bus 18. This digital word on bus 18 has a value which indicates the number of words stored in a buffer memory 20 to be described hereinafter. Each threshold circuit 61, 62 and 63 produces an energizing signal at its output of the absolute magnitude of the difference provided by difference circuit 16 is greater than a predetermined threshold level. This threshold level is, in turn, a function of the value of the digital word provided on bus 18.

Each threshold circuit, for reasons to be presented hereinafter, has a different threshold value functional relationship to the digital word on bus 18 such that for any given value of the digital word on bus 18 greater than a predetermined minimum value to be discussed hereinafter, threshold circuit 61 requires the lowest difference from difference circuit 16 and threshold circuit 63 requires the largest difference for an energizing signal to be produced at their respective outputs. Each of the threshold circuits 61, 62 and 63 has its output connected to one input of one of three AND gates 51, 52 and 53, respectively. This input is energized by its corresponding threshold circuit each time that the threshold circuit determines that the difference from difference circuit 16 exceeds the threshold level in that threshold circuit for the particular value of digital word provided on bus 18.

Another input from each of the AND gates 51, 52 and 53 is connected to line 15 and is therefore energized by address and sync generator 12 a short predetermined interval after a new address word is provided by the generator on bus 13.

The third and last input of each of the AND gates 51, 52 and 53 is connected to one of the three outputs 56, 57 or 58, respectively, of a three cell shift register 55. Only one of the outputs of shift register 55 provides an energizing signal equivalent to a logical "1" during any given instant.

In a manner to be described hereinafter, energizing signals provided on bus 75 over lines 75' and 75'' to each of the two inputs of shift register 55 causes this logical "1" to be shifted either right or left within the shift register. Shift register 55 is constructed, however, in a manner so as to prevent the logical "1" from being shifted out completely from the last remaining cell at either end of the shift register. Hence, if a pulse is applied on line 75' the logical "1" within shift register 55 is shifted one position toward the cell of register 55 whose output is designated as line 56. On the other hand, if an energizing pulse is provided on line 75'' the logical "1" within register 55 is shifted one cell toward the end cell in register 55 which provides an output on the line designated as line 58. Register 55 has cells equal in number at least to the number of threshold circuits. Consequently, since only one cell of register 55 provides a logical "1" output during any given instant only one of the AND gates 51, 52 or 53 will have its third input energized by one of the cells from register 55. Therefore, during any given instant when an energizing pulse is provided on line 15 only one of the threshold circuits 61, 62 or 63 is permitted to provide an output through its corresponding AND gate to one input of a three input OR gate 54. The output of OR gate 54 is coupled by way of line 17 to the control inputs of transmission gates 21 and 22 and also to one input of an OR gate 28.

If the threshold circuit which is chosen by shift register 55 is producing an energizing signal at its output, this energizing signal is coupled by way of line 17 through OR gate 28 to the write input of buffer memory 20, thereby causing the new digital word on bus 11 and its corresponding address on bus 13 to be written into buffer memory 20. In addition, the energizing signal on line 17 activates the control input of transmission gate 21, thereby causing the new digital word on bus 11 to be coupled through gate 21 to the input of frame memory 19. If the difference provided by difference circuit 16 does not exceed the threshold level of the threshold circuit whose output is selected by the shift register 55 to be connected through to OR gate 54, an energizing signal is not provided on line 17, the inhibit input of transmission gate 22 is not energized, and the digital word from output of frame memory 19 corresponding to the video amplitude in a previous frame is coupled through transmission gate 22 to the input of frame memory 19. In this way an entire frame of digital words is constantly stored and recirculated within frame memory 17 with each digital word being updated when a new digital word from bus 11 has been determined to differ significantly from the one which has been previously stored.

Each time that the write input of buffer memory 20 is activated, the forward input of a forward-backward counter 23 is also energized, thereby causing counter 23 to advance the count which is presented at its output bus 24 by one. Each time that an energizing signal is presented on a line 72 to the read input of buffer memory 20, the backward input of counter 23 is also energized thereby reducing the count on bus 24 by one. Hence, the digital word presented by counter 23 on bus 24 is a continuous indication as to the number of words presently in storage within buffer memory 20. This digital word on bus 24 is coupled by way of bus 18 to the above-mentioned second input of each of the threshold circuits 61, 62 and 63.

The threshold level for each of the threshold circuits 61, 62 and 63 which must be exceeded by the difference provided by difference circuit 16 before that difference is permitted to provide an energizing signal on line 17 is a monotonically increasing function of the magnitude of the digital word on bus 18. When a large digital word is presented on bus 18, thereby indicating that a large number of words are presently being stored by buffer memory 20, each of the threshold circuits requires a large threshold difference. When the count indicated by the digital word on bus 18 is low, the threshold circuit requires a lower threshold difference. Consequently, as the buffer memory nears its maximum capacity, a much greater difference is required to exist between the new digital word on bus 11 and the previously stored digital word from frame memory 19 before the new word is coupled into the buffer memory for transmission to the receiving location. This relationship between the difference from difference circuit 16 and the number of words in buffer memory 20 is illustrated for each of the threshold circuits 61, 62 and 63 by the curves shown in FIG. 7 of the drawings. Curves 761, 762 and 763 correspond to threshold circuits 61, 62 and 63, respectively.

Figure 7:
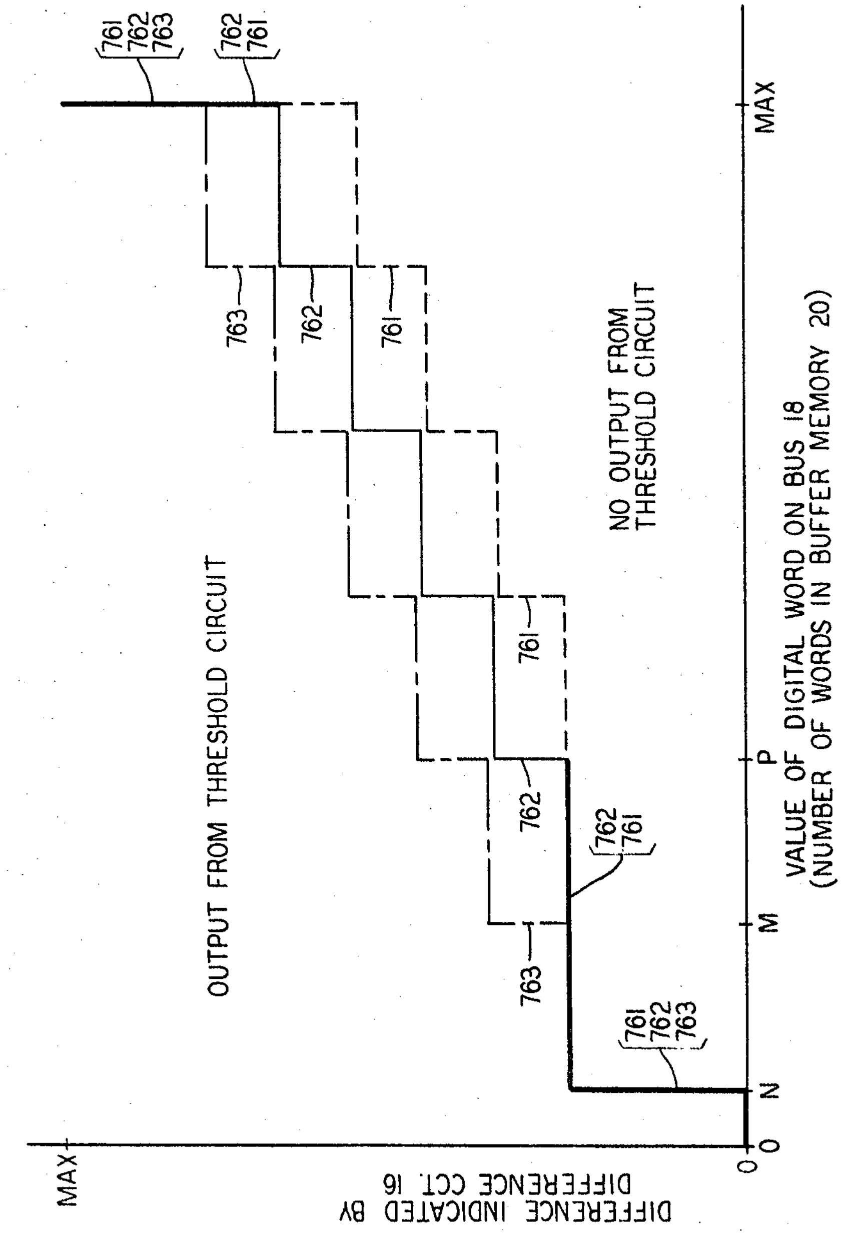
FIG. 7 is a graph which illustrated the input output relationships for the threshold circuits shown as blocks in FIG. 1.

In FIG. 7, if the point determined by any given abscissa and ordinate lies between a curve and the axis of ordinates, an energizing signal is provided at the output of the threshold circuit corresponding to that curve. If, on the other hand, the point lies between a curve and the axis of abscissas, an energizing signal is not provided at the output of the threshold circuit.

As indicated by each of the curves, as the number of words in buffer memory 20 increases a larger difference is required to exist before an output is produced by any one of the threshold circuits. For any given number of words in buffer memory 20 in excess of the value designated as P in FIG. 7, threshold circuit 61 requires the smallest difference to exist, threshold circuit 63 requires the greatest difference and threshold circuit 62 requires an intermediate difference, as illustrated by curves 761, 763 and 762, respectively. For any number of words in buffer memory 20 up to and including the value designated on the axis of the abscissas as N in FIG. 7, an output is provided from all three threshold circuits no matter what value of difference is indicated by difference circuit 16. This characteristic of the threshold circuits causes buffer memory 20 to always have at least N words in storage. As is pointed out hereinafter, the words are read out of buffer memory in blocks each one of which in the present embodiment includes N digital words. For any number of words in buffer memory 20 greater than N but not greater than the value designated in FIG. 7 as M, all threshold circuits have the same threshold level.

The output of address and sync generator 12, in addition to being coupled by way of bus 13 to the input of buffer memory 20 is also coupled to the input of a frame detector 26. When the address corresponding to the first picture element in a video frame is presented on bus 13, frame detector 26 produces an output energizing pulse to an input or OR gate 28 and also to the forward input of a forward-backward counter 25. This energizing pulse from frame detector 26 couples through OR gate 28 to the write input of buffer memory 20, thereby causing the digital word on bus 11 corresponding to the first picture element of a video frame to be written into buffer memory 20. Hence, this first picture element of a video frame is forced to be written into buffer memory 20 even though it may not differ significantly from its corresponding previously stored sample in frame memory 19. The backward input of forward-backward counter 25 is energized when a second frame detector 27 produces an output energizing pulse. Frame detector 27 has its input coupled to receive those bits from the output of buffer memory 20 which corresponds to the address of the word read out of buffer memory 20. Frame detector 27 like frame detector 26 recognizes the address corresponding to the first picture element in video frame. Accordingly, the count presented by forward-backward counter 25 at its output on bus 74 is advanced by one each time that the first picture element of a video frame is written into buffer memory 20 and is reduced by one each time that the first picture element of a video frame is read out of buffer memory 20. Hence, the count presented by counter 25 on bus 74 is an indication of the number of frames stored within buffer memory 20.

Figure 2:
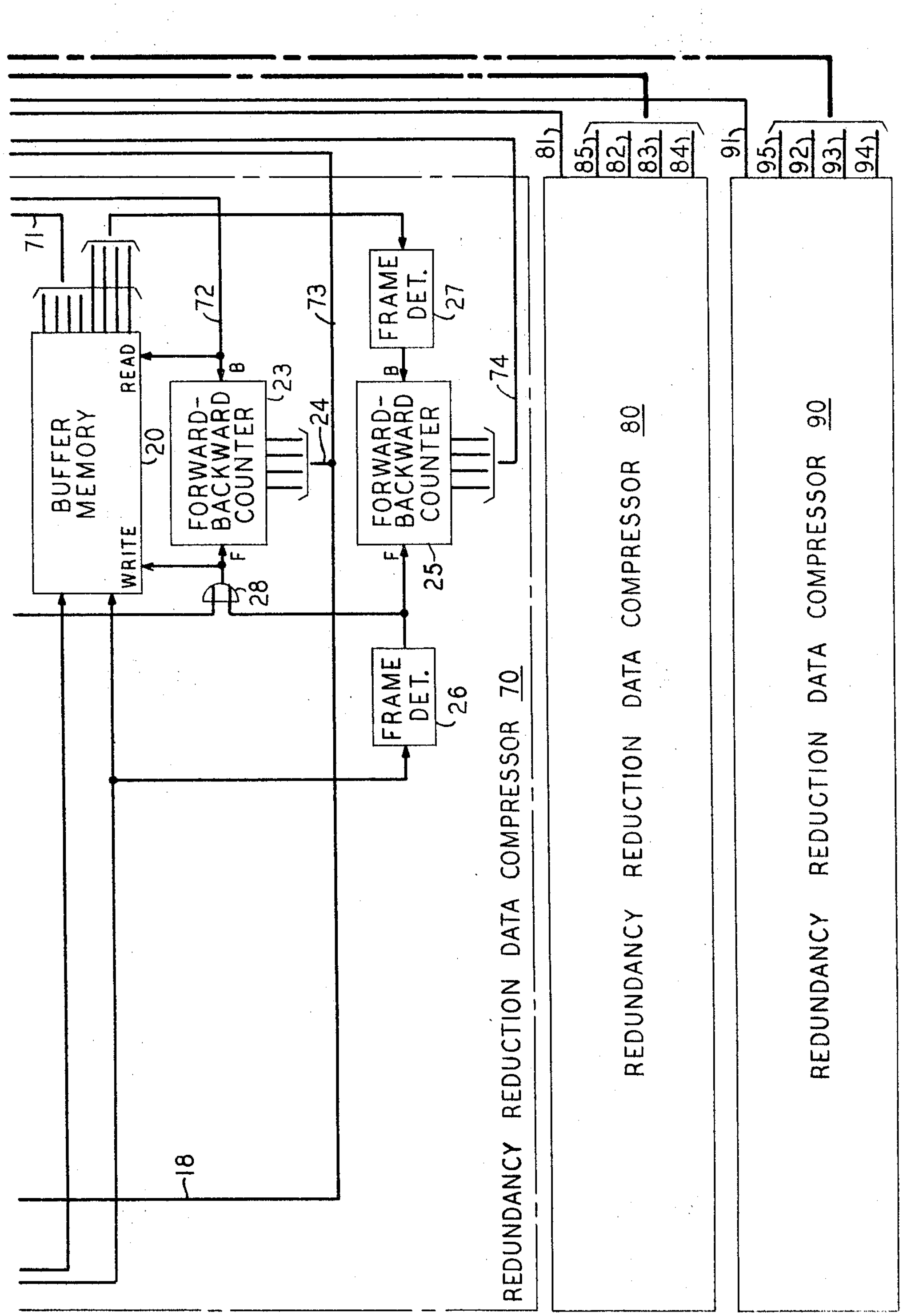
Figure 4:
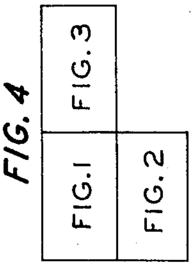

The apparatus which has been thus far described is associated with a single source of video data and provides digital words at the output of buffer memory 20 which are necessary to reconstruct that video data at a receiving location. The apparatus associated with this single source thus far described is designated in FIGS. 1 and 2 of the drawings as redundancy reduction data compressor 70. Other video signal sources, along with their associated circuits identical to those described hereinabove in connection with source 10, are present within the enclosures designated in FIG. 2 as redundancy reduction data compressors 80 and 90. The digital words presented at the outputs of the buffer memories within each of the redundancy reduction data compressors 70, 80 and 90 are coupled by way of buses 71, 81 and 91, respectively, to the inputs of a time division multiplexing switch 30 in FIG. 3.

The digital data words corresponding to the video signals generated within data compressors 80 and 90 are made available on buses 81 and 91, respectively, in response to energizing signals delivered by lines 82 and 92, respectively to the read inputs of their respective buffer memories (not shown). The digital words from each of the redundancy reduction data compressors which indicate the number of frames stored within their respective buffer memories are coupled by way of buses 74, 84 and 94 to a control logic circuit 44 in FIG. 3. Similarly, the digital words from each of the data compressors which indicate the number of words stored in their respective buffer memories are coupled by way of buses 73, 83 and 93 to control logic circuit 44.

Control logic circuits 44 performs two basic functions: (1) that of selecting the sequence and duration of connecting the buffer memory in each of the data compressors through time division multiplexing switch 30 to a digital transmitter 33; and (2) that of changing the threshold circuit which is selected by shift register 55 in each of the data compressors.

In performing the first function control logic circuit 44, in a manner to be described hereinafter, gives priority to the digital words provided on buses 74, 84 and 94 which indicate the number of frames stored in each of the buffer memories. If any one of the three data compressors has fewer frames in storage than either of the other two, control logic circuit 44 selects the data compressor 70, 80 or 90 having the largest (or one of the larger if the two largest are equal) number of frames in storage. When all of the data compressors have an equal number of frames in storage as indicated by equal digital words on buses 74, 84 and 94, then control logic circuit 44 utilizes the digital words provided on buses 73, 83 and 93 to select the data compressor having the largest number of words in storage. If all three data compressors have an equal number of frames and words in storage (an extremely unlikely condition) data compressor 70 is arbitrarily selected.

When a data compressor is selected by control logic circuit 44, a digital word is provided by the control circuit via bus 31 to the control input of time division multiplexing switch 30 which causes switch 30 to connect the bus 71, 81 or 91 from the selected data compressor through switch 30 via bus 32 to digital transmitter 33. In addition, control logic circuit 44 provides a second digital word by way of bus 35 to code generator 37. In response to the word on bus 35, generator 37 provides a digital code word to digital transmitter 33 by way of bus 36 which code word identifies the data compressor presently connected by way of switch 30 to the input of digital transmitter 33. Finally, after a data compressor has been selected, control logic circuit 44 couples a series of N energizing pulses by way of lines 72, 82 or 92 to the selected data compressor. In response to this series of N energizing pulses a block of N data words along with their corresponding address words are read out of the buffer memory of the selected data compressor by way of its respective bus through switch 30 to digital transmitter 33. Digital transmitter 33 in a manner well known to those skilled in the pulse code modulation art, translates the code word presented on bus 36 by generator 37 and the series of digital data words presented to its input by way of bus 32 into a serial bit stream on a high capacity transmission channel 34. By causing the code word from generator 37 to precede the N digital data and address words on bus 32, a receiver connected to the other end of transmission channel 34 may utilize the code word from generator 37 to initially determine which one of several buffer memories should receive the N digital data and address words which follow the code word.

In order to perform the above-mentioned second basic function of effectively changing the threshold level in each of the data compressors when a change is required, control logic circuit 44 counts the number of blocks of N digital words transmitted from each of the data processors within successive equal intervals, each interval equal in the present embodiment to the interval required for control logic circuit 44 to read out K blocks of digital words from the buffer memories. At the end of each interval equal to K blocks of digital words, control logic circuit computes a figure of use for each of the data compressors. The new figure of use for the $i^{th}$ data compressor, $A_n(i$, is calculated in accordance with the following equation:

$$A_n(i)=[B(i)+A_o(i)]\times D$$

where $B(i)$ is the number of blocks transmitted from the $i^{th}$ data compressor during the last interval of K blocks;

$A_o(i)$ is the figure of use computed during the last interval of K blocks;

$D$ is a decay factor smaller than unity, 0.96 being a representative value.

As will be appreciated by those skilled in the art, the figure of use for each data compressor is in essence a running count of the number of blocks transmitted from that data compressor with the number of blocks transmitted during any one of the preceding intervals having less and less effect as that interval recedes in time.

The control logic circuit 44 also develops an average figure of use, $\overline{A}$, by summing the $A_n(i)$ for all of the data compressors and dividing the sum by the number of data compressors. The figure of use, $A_n(i)$, for each of the data compressors is compared with the average $\overline{A}$. If the figure of use for a data compressor is greater or less than the average, $\overline{A}$, by more than predetermined number, Δ. the control logic circuit 44 transmits an energizing signal over the appropriate line in the corresponding bus 75, 85 or 95 in order to change the threshold circuit being utilized in the redundancy reduction data compressor corresponding to that figure of use.

For example, if redundancy reduction data compressor 70 has transmitted a number of blocks which results in a figure of use which is less than the average, $\overline{A}$, by more than the above-mentioned predetermined number, Δ, line 75′ on bus 75 is energized by control logic circuit 44. As discussed hereinabove, in connection with the operation of shift register 55 an energizing pulse on line 75′ causes the energizing signal in shift register 55 to be shifted toward the cell of shift register 55 which provides an output on line 56. Hence, if shift register 55 had been providing an energizing signal on line 58 thereby causing threshold circuit 63 to be utilized, an energizing pulse on line 75′ causes the energizing signal on shift register 55 to shift by one position to provide an energizing signal on line 57 thereby causing threshold circuit 62 to be substituted for threshold circuit 63. As indicated hereinabove and illustrated in FIG. 7 of the drawings, threshold circuit 62 provides a lower threshold level for digital words in excess of the value designated as M in FIG. 7. Similarly, if the figure of use for data compressor 70 is determined by control logic circuit 44 to be greater than the average, $\overline{A}$, by more than the predetermined number, Δ, line 75″ on bus 75 is energized thereby causing a threshold circuit having a higher threshold level to be substituted. As pointed out hereinabove in connection with the discussion of shift register 55, when the energizing signal in register 55 occupies an end cell no shift takes place even though an energizing signal is provided to the shift register over the line connected to that end.

Control of the threshold levels in redundancy reduction data compressors 80 and 90 is achieved by control logic circuit 44 in an identical fashion as described hereinabove in connection with redundancy reduction apparatus 70 by providing the energizing pulse on the appropriate line within bus 85, or 95, respectively.

Figure 5:
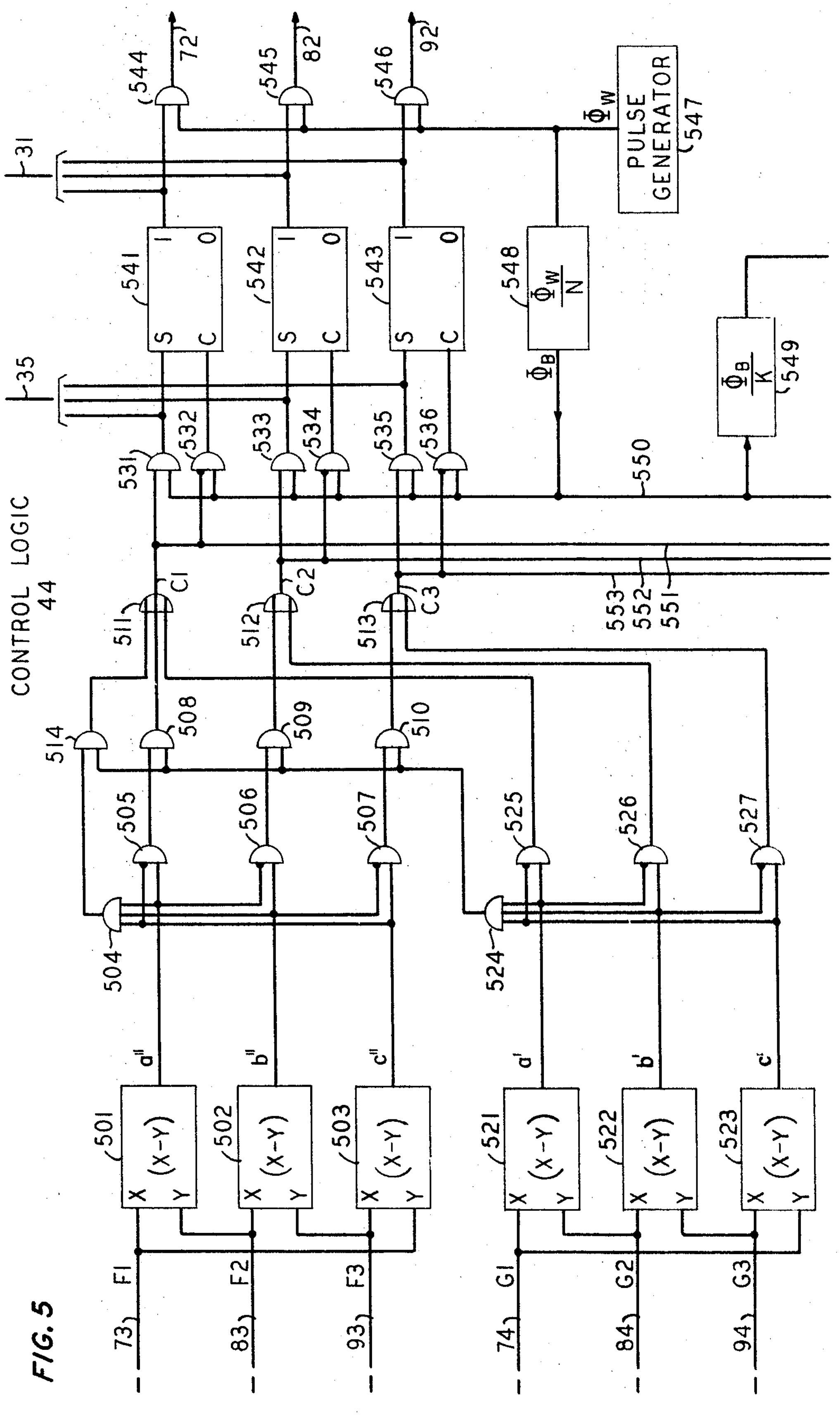
FIGS. 5 and 6, when placed in juxtaposition with the identically designated lines connected, provide a detailed schematic block diagram of one embodiment of the control logic circuit shown as a block in FIG. 3.
Figure 6:
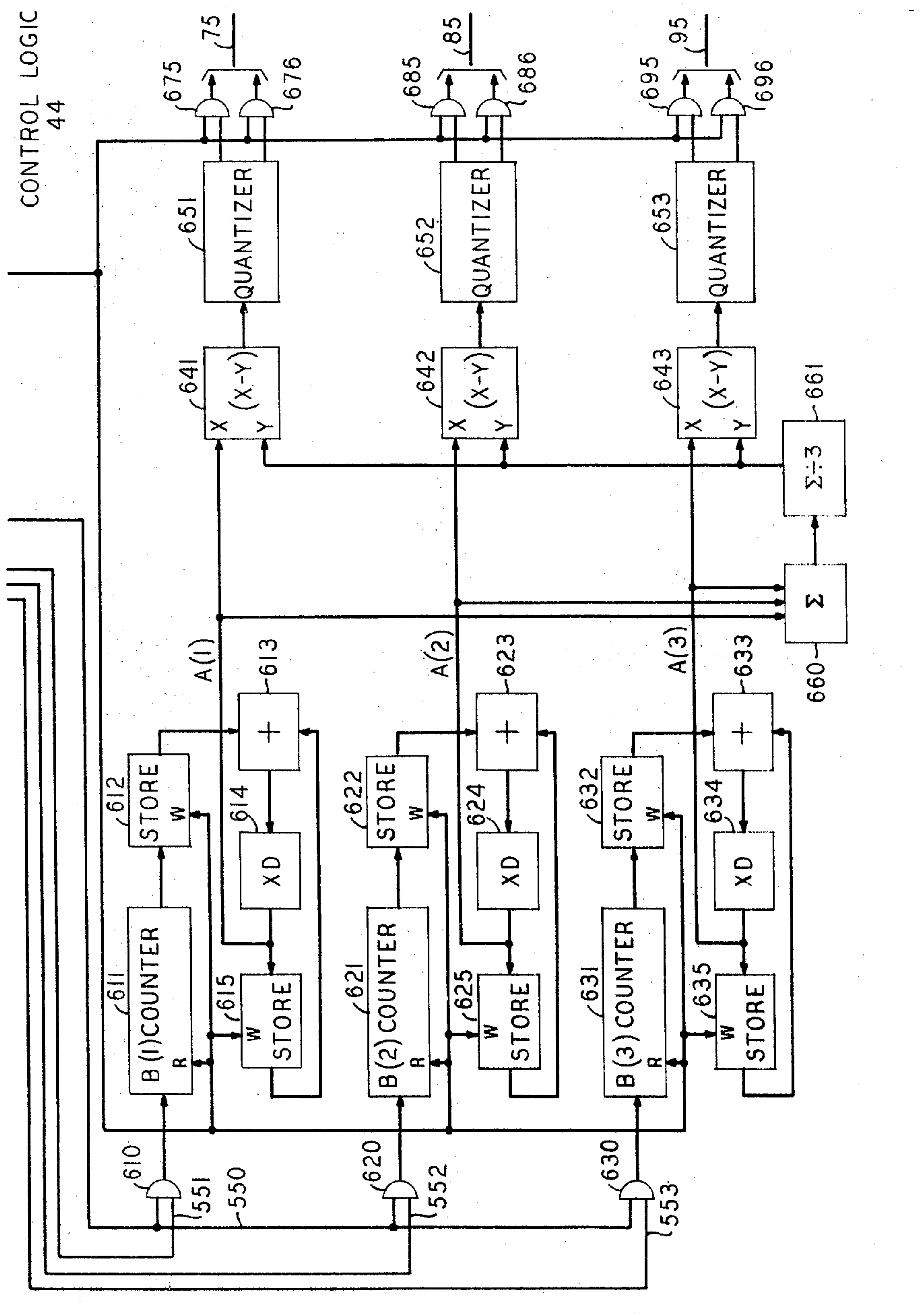

FIGS. 5 and 6 provide one embodiment for control logic circuit 44. The apparatus shown in FIG. 5 performs the function of selecting which one of the several data compressors shall have its buffer memory connected through time division multiplexing switch 30 to the digital transmitter 33. The apparatus shown in FIG. 6 utilizes information obtained from the apparatus in FIG. 5 to perform the function of controlling the threshold level in each of the redundancy reduction data compressors.

In FIG. 5 the digital words provided on buses 74, 84 and 94, indicating the number of frames stored in each of the buffer memories, have been designated as G1, G2 and G3, respectively. The buses 74, 84 and 94 are each connected to one input of subtractor circuits 521, 522 and 523, respectively. The other input of subtractor circuit 521 is connected to bus 84 to receive the digital word G2. The other input of subtractor circuit 522 is connected to bus 94 to receive the digital word G3. The other input of subtractor circuit 523 is connected to bus 74 to receive the digital word G1. Each of the subtractor circuits performs a subtraction operation on the digital words provided at its two inputs and provides at its output the sign bit only. If the digital word connected to the one input (designated in FIG. 5 as X) is equal to, or greater than, the digital word provided at the other input (designated in FIG. 5 as Y), the sign bit provided at the output of a subtractor circuit is equal to a logical "1." If the digital word provided at the X input is less than the digital word provided at the Y input, the sign bit provided by the subtractor circuit is equal to a logical "0." The sign bits provided at the outputs of subtractor circuits 521, 522 and 523 have been designated in FIG. 5 as *a′*, *b′* and *c′*.

All of the possible value relationships between the digital words, *G1*, *G2* and *G3*, the resulting sign bit outputs from subtractor circuits 521, 522 and 523, and the conclusions to be derived from these outputs are presented in the following truth table:

| | a | b′ | c′ | Conclusion |
|---|---|---|---|---|
| $G1 \geq G2 > G3$ | 1 | 1 | 0 | Select data. |
| $G1 > G2 \geq G3$ | 1 | 1 | 0 | Compressor. |
| $G1 > G3 > G2$ | 1 | 0 | 1 | Producing G1. |
| $G2 \geq G3 > G1$ | 0 | 0 | 1 | Select data. |
| $G2 > G3 \geq G1$ | 0 | 1 | 1 | Compressor. |
| $G2 > G1 > G3$ | 0 | 1 | 1 | Producing G2. |
| $G3 \geq G1 > G2$ | 1 | 0 | 1 | Select data. |
| $G3 > G1 \geq G2$ | 1 | 1 | 1 | Compressor. |
| $G3 > G2 > G1$ | 0 | 1 | 1 | Producing G3. |
| $G1 = G2 = G3$ | 1 | 1 | 1 | (Select data compressor from F words). |

From the truth table it can be seen that the condition wherein the digital word *G1* is larger than either of the digital words *G2* or *G3* can be recognized that *a′* is a logical "1" and *c′* is a logical "O." Accordingly, AND gate 525 having one input connected to the output of subtractor circuit 521 and an inhibit input connected to the output of subtractor circuit 523 will provide an energizing signal at its output when the data compressor producing the digital word *G1* is to be selected. In a similar fashion, AND gate 526 provides an energizing signal at its output when *a′* is a logical "*O*." and *b′* is a logical "1" thereby indicating that the data compressor producing the digital word G2 is to be selected, and AND gate 527 provides an energizing signal at its output when ′ is a logical "0" and *c′* is a logical "1" thereby indicating that the data compressor producing the digital word *G3* is to be selected. For the condition where two digital words are equal in value and each of them is larger than the third one of the digital words, only one output will be provided by AND gates 525, 526 and 527. As indicated in the truth table the particular output provided will correspond to one of the larger digital words.

When all three digital words are equal in value, a logical "1" will appear at each of the sign bit locations, *a′*, *b′* and *c′*. AND gate 524 having each of its three inputs connected to a different one of the sign bits from the three subtractor circuits 521, 522 and 523 provides an energizing signal at its output when the three digital words *G1*, *G2* and *G3* are equal in value, that is when the three data compressors have the same number of frames in storage in their buffer memories.

The digital words on buses 73, 83 and 93, indicating the number of words stored in each of the buffer memories, have been designated in FIG. 5 as F1, F2 and F3. Buses 73, 83 and 93 are connected to subtractor circuits 501, 502 and 503 in a fashion similar to that described hereinabove in connection with buses 74, 84 and 94 and the subtractor circuits 521, 522 and 523. AND gates 505, 506 and 507 are connected to the outputs of subtractor circuits 501, 502 and 503 in a fashion similar to the connections described hereinabove in connection with AND gates 525, 526 and 527 and subtractor circuits 521, 522 and 523. A truth table similar to that provided hereinabove for the *G1*, *G2* and *G3* digital words, may therefore be constructed for the F1, F2 and F3 digital words and the *a″*, *b″* and *c″* sign bit outputs of subtractor circuits 501, 502 and 503, respectively. AND gate 505 provides an energizing signal at its output when the digital word F1 is larger than either of the other two digital words. Similarly, AND gate 506 provides an energizing signal at its output when the digital word F2 is the largest, and AND gate 507 provides an energizing signal at it output when the digital word F3 is the largest.

A three input AND gate 504 has one input connected to each of the three sign bit outputs *a″*, *b″* and *c″* of subtractor circuits 501, 502 and 503. An energizing signal is therefore provided by AND gate 504 when all three digital words F1, F2 and F3 are equal in value corresponding to the situation where all three buffer memories have the same number of words in storage. The output of each of the AND gates 504, 505, 506 and 507 is connected to one input of AND gates 514, 508, 509 and 510, respectively. The other input of each of the last-mentioned AND gates is connected to the output of AND gate 524. Hence, an output from any one of the AND gates 504—507 will be gated through to the output of its respective AND gate 514, 508, 509 or 510 only when AND gate 524 is energized, that is, only when all buffer memories have the same number of frames in storage. Since AND gate 524 is energized only when no one of the AND gates 525, 526 and 527 is energized, only one of the seven AND gates 514, 508, 509, 510, 525, 526 and 527 is energized during any given instant.

The outputs of AND gates 514, 508 and 525 are combined in an OR gate 511 which produces an energizing signal at its output designated in FIG. 5 as line C1 when the buffer memory in redundancy reduction data compressor 70 has been selected as a candidate for connection through to digital transmitter 33. This selection may, of course, have been made either on the basis that this buffer memory has the largest number of frames in storage or on the basis that all buffer memories have an equal number of frames in storage, but this buffer memory has the largest number of words in storage or has been selected by virtue of an output from AND gate 514. In effect, connection of the output of AND gate 514, to OR gate 511 causes the buffer memory in data compressor 70 to be arbitrarily selected when all of the buffer memories have the same number of words and frames in storage. The selection is only as a candidate since this buffer memory is only in fact connected through to digital transmitter 33 when the energizing signal on line C1 is coincident with an energizing pulse to be described and designated hereinafter as belonging to pulse train $\Phi_B$.

Similarly, the outputs from AND gates 509 and 526 are combined through OR gate 512 to provide an energizing signal at the output of OR gate 512 designated in FIG. 5 as line C2 when the buffer memory in redundancy reduction data compressor 80 has been selected as a candidate for connection through to the digital transmitter 33. AND gates 510 and 527 have their outputs combined through OR gate 513 designated as line C3 in FIG. 5 when the buffer memory in redundancy reduction data compressor 90 is selected.

A pulse generator 547 in FIG. 5 provides energizing pulses, designated herein as $\Phi_{tr}$, at a rate equal to that at which digital words are read out of the selected buffer memory. This pulse train $\Phi_{tr}$ is connected to the input of a divider network 548 which provides an energizing pulse at its output for every N energizing pulses presented to its input. Hence, a pulse train designated herein as $\Phi_B$ is presented at the output of divider network 548 with one energizing pulse occurring for each block of N pulses out of pulse generator 547.

The output of OR gate 511, line C1, is connected to the input of an AND gate 531, the other input of which is connected to the output of divider network 548. The output of OR gate 511 is also connected to the inhibit input of an AND gate 532 whose other input is also connected to the output of divider network 548. Hence, either AND gate 531 or AND gate 532 will be energized when the energizing pulse is produced at the output of divider network 548. The particular AND gate energized depends on whether a signal equivalent to a logical "1" or a logical "O" is present on line C1. If the buffer memory in redundancy reduction data compressor 70 has been selected and therefore an energizing signal is present on line C1, AND gate 531 is energized by the output of divider network 548 when the $\Phi_B$ pulse occurs, thereby setting flip-flop 541 whose set input is connected to the output of AND gate 531. If, on the other hand, buffer memory 20 of redundancy reduction data compressor 70 has not been selected, AND gate 532 is energized by the $\Phi_B$ pulse thereby energizing the clear input of flip-flop 541 which is connected to the output of AND gate 532. Accordingly, flip-flop 541 will be set by the $\Phi_B$ energizing pulse from the output of divider network 548 if buffer memory 20 of of redundancy reduction data compressor 70 has been selected and it will be cleared by the energizing pulse from the output of divider network 548 if buffer memory 20 of redundancy reduction data compressor 70 has not been selected.

In a similar fashion, the output of OR gate 512, line C2, is combined with the output of the divider network 548 through AND gates 533 and 534 to the set and clear inputs of a flip-flop 542. The output from OR gate 513, line C3, is also combined with the output from divider network 548 through AND gates 535 and 536 to the set and clear inputs of a flip-flop 543. Each of the flip-flops 542 and 543 is set by the $\Phi_B$ pulse from divider network 548 if their respective buffer memory is selected at the instant when the $\Phi_B$ pulse occurs, and is cleared at this time if its respective buffer memory is not selected. Hence, during the instant when divider network 548 produces an energizing pulse at its output, only one of the three flip-flops 541, 542 and 543 will be set, whereas the other two will be cleared.

Figure 3:
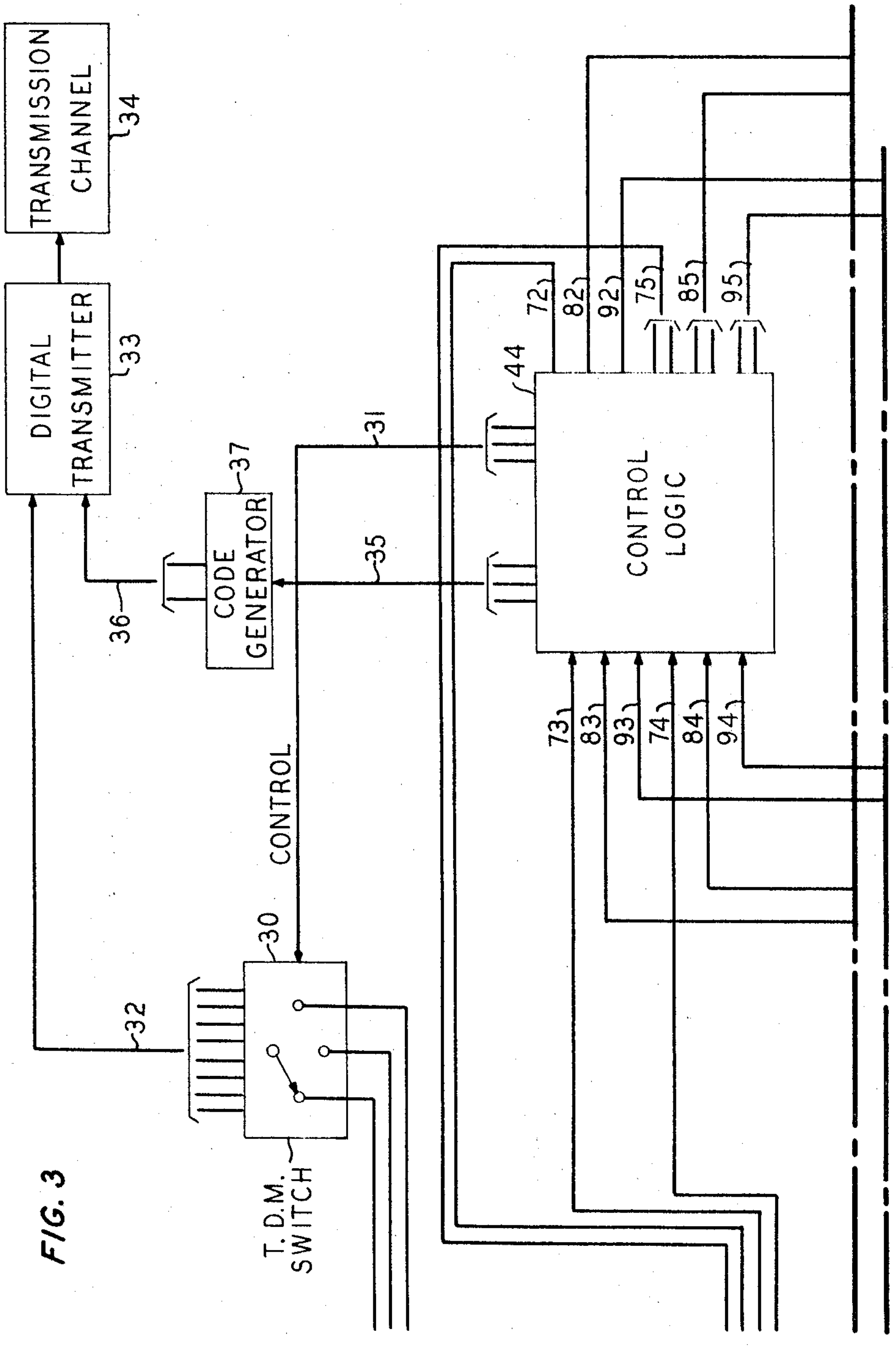

The three outputs from gates 531, 533 and 535 are connected by way of bus 35 to the code generator 37 in FIG. 3. The particular set input which is energized by these gates identifies to the code generator which one of the three buffer memories has been selected to provide the next block of digital words. The "1" outputs from flip-flops 541, 542 and 543 are connected by way of bus 31 to the control input of the time division multiplexing switch 30 in FIG. 3. The particular flip-flop which has been set causes a logical "1" to be coupled over its line on bus 31 to switch 30 thereby indicating to switch 30 which one of the three buffer memories should be connected to digital transmitter 33 for the entire duration of time between successive pulses from the output of divider network 548.

The "1" output from each of the flip-flops 541, 542 and 543 is also connected to one input of one of the two-input AND gates 544, 545, and 546, respectively. The other input of each of the AND gates 544, 545 and 546 is connected to the output of pulse generator 547. Hence, the AND gate 544, 545 or 546 whose one input is connected to the flip-flop 542, 542 or 543 which is set will couple the energizing pulses from generator 547 to its respective output line 72, 82 or 92. An entire block of pulses from generator 547 will be coupled in this way to the buffer memory whose read input is connected to the selected line 72, 82 or 92. The number of words thereby read out of the selected buffer memory will be equal in number of the number of pulses generated by generator 547 during at least one interval between successive pulses from divider network 548.

The output of divider network 548 is also connected via line 550 to one of the two inputs of each of three AND gates 610, 620 and 630 in FIG. 6. The other input of each of these AND gates 610, 620 and 630 is connected to one of the lines C1, C2 and C3, respectively. The outputs of AND gates 610, 620, and 630 are connected to the inputs of counters 611, 621 and 631, respectively. Each time that an energizing signal on one of the three lines C1, C2 or C3 is selected by the output pulse from divider network 548 to set its corresponding flip-flop and thereby cause the buffer memory corresponding to that flip-flop to be read out for one complete block of pulses from generator 547, the AND gate 610, 620 or 630 corresponding to that line C1, C2 or C3, respectively, is also energized, thereby advancing the count in its respective counter by one. Accordingly, each of the counters 611, 621 and 631 provide an indication as to the number of blocks of digital words which have been read out of their corresponding buffer memories.

A second divider circuit 549 having its input connected to line 550 provides an output energizing pulse for every K energizing pulses provided at the output of divider network 548. The output of divider network 549 is connected to the reset inputs of counters 611, 621 and 631 thereby causing each of the counters to be reset to zero after K blocks of digital words have been transmitted over the transmission channel.

Each time that counter 611 is reset the count available prior to reset in counter 611 is written into a store 612. The output of store 612 is constantly available to one input of an addition network 613. The other input of network 613 is constantly provided by an output from a second store 615. The sum of the two values contained in store 612 and 615 is available at the output of the addition network 613 and is multiplied in a multiplier network 614 by a constant designated in the drawings as D, where D is a decay factor smaller than unity, 0.96 being a representative value. The output from multiplier network 614 is in turn written into store 615 each time that counter 611 is reset. The output of multiplier network 614 is also connected to the X input of a difference circuit 641 and is designated in the drawings as having a value of A(1).

The value designated as A(1) is therefore equal to the sum of the number of blocks of digital words transmitted from the buffer memory corresponding to counter 611 during the interval between successive pulses from divider network 549 plus the previous value for A(1) all multiplied by a decay factor, D, smaller than unity. The value A(1) is therefore a measure of the use that the buffer memory in data compressor 70 has made of the transmission channel in the past, with the intervals between successive pulses from the output of divider network 549, having less and less effect (because of the decay factor) as they recede in time.

Counter 621, store 622, addition network 623, multiplier network 624 and store 625 operate in an identical fashion as that described hereinabove in connection with A(1) to provide a value designated as A(2) in FIG. 6 in response to AND gate 620 which value indicates the use made of the transmission channel by the buffer memory within data compressor 80. Similarly, a value A(3) is developed by circuits 631, 631, 633, 634 and 635 in response to AND gate 630 to indicate the use made of the transmission channel by the buffer memory within data compressor 90. The three values A(1), A(2) and A(3) are each connected to one of the three inputs of a summation network 660 whose output is divided by the number of buffer memories in divider network 661 (divisor equal to 3 in this embodiment) to provide at its output an average value of A. This average value of A is connected to the Y input of difference network 641. Similarly, the difference between A(2) and the average value of A and the difference between A(3) and the average value of A is provided by difference networks 642 and 643, respectively.

The differences available from difference circuits 641, 642 and 643 are presented to the inputs of quantizers 651, 652 and 653, respectively. If the difference presented to any one of the three quantizers is less than an established value, $-\Delta$, the quantizer produces an energizing signal at one of its two outputs. If the difference available to a quantizer is greater than a positive established value, $+\Delta$, the quantizer produces an energizing signal at the other one of its two outputs. If the difference available to a quantizer is between $-\Delta$ and $+\Delta$, then the quantizer does not provide an energizing signal at either of its two outputs.

Each output from quantizer 651 is connected to an input of one of the AND gates 675 and 676. The other input of each of the AND gates 675 and 676 is connected to the output of divider network 549. Consequently, each time that an energizing pulse is provided at the output of divider network 549, any energizing signal present at either of the two outputs of quantizer 651 is coupled through either AND gate 675 or 676 to a line of bus 75. Similarly, the outputs of quantizer 652 are gated through AND gates 685 and 686 and the outputs of quantizer 653 are gated through AND gates 695 and 696 to the lines of buses 85 and 95, respectively, each time that an output energizing pulse is provided by divider network 549. As pointed out hereinabove, the lines of buses 75, 85 and 95 are connected to the shift register 55 in each of the data compressors 70, 80 and 90, respectively. The output of a quantizer which produces an energizing signal when its input is less than $-\Delta$ is gated to the single primed line of its corresponding bus, whereas the output which produces an energizing signal when its input is greater than $+\Delta$ is gated to the double primed line of its corresponding bus. As a result, greater than average use of the transmission channel by any data compressor will cause a threshold circuit with higher threshold values to be substituted, whereas less than average use will cause a threshold circuit with lower threshold values to be substituted.

It should be understood that the embodiments herein described are merely illustrative of a small number of the many possible applications of the principles of the invention. Numerous and varied other arrangements may readily be devised by those skilled in the art without departing from the spirit and scope of the invention.

We claim:

1. In combination, a plurality of data compressors each one of which has a buffer memory means for storing selected video samples taken from successive frames of a video signal, and a counting means for registering the number of video frames corresponding to the samples stored in said buffer memory means, means for transmitting samples, and a time division multiplex switching means responsive to said counting means in each of said plurality of data compressors for selectively connecting to said transmitting means the data compressor having stored samples corresponding to the largest number of video frames.

2. The combination as defined in claim 1 wherein each of said plurality of data compressors also includes a second counting means for registering the number of samples stored in its corresponding buffer memory means, and said time division multiplex switching means in response to said second counting means selectively connects the data compressor having the largest number of samples in storage to said transmitting means when said first-mentioned counting means indicates that all of said data compressors have samples stored in their buffer memory means which correspond to the same number of video frames.

3. Asynchronous time division multiplexing apparatus in combination with a plurality of data compressors each of which reduces the redundancy in the samples transmitted from a video signal, frame memory means within each of said plurality of data compressors for storing an entire frame of video samples, means within each of said plurality of data compressors for comparing each new video sample with a previously stored video sample from said frame memory means to produce an energizing signal if the difference between the new sample and stored sample exceeds a threshold level, buffer memory means within each of said plurality of data compressors for storing said new sample in response to said energizing signal, a counting means within each of said plurality of data compressors for registering the number of video frames corresponding to the samples stored in its corresponding buffer memory means, means for transmitting video samples, a time division multiplex switching means for selectively connecting the samples stored in the buffer memory means of said plurality of data compressors to said transmitting means in response to a control signal, control means responsive to the counting means in each of said plurality of data compressors for providing a control signal to said multiplex switching means which causes the data compressor having samples stored in its buffer memory means which correspond to the largest number of video frames to be connected to said transmitting means.

4. Apparatus as defined in claim 3 wherein the combination further includes a second counting means within each of said plurality of data compressors for registering the number of samples stored in its corresponding buffer memory means, and said control means responds to said second counting means in each of said plurality of data compressors for providing a control signal to said multiplex switching means which causes the data compressor having the largest number of samples in storage in its buffer memory means to be connected to said transmitting means when said first-mentioned counting means indicates that all data compressors of said plurality of data compressors have samples stored in their buffer memory means which correspond to the same number of video frames.

5. Apparatus as defined in claim 3 wherein said control means includes means for counting the number of samples transmitted from each of said plurality of data compressors within a predetermined interval, and means for changing said threshold level in response to said means for counting the number of samples transmitted.

6. Apparatus as defined in claim 4 wherein said control means includes means for counting the number of samples transmitted from each of said plurality of data compressors within a predetermined interval, and means for changing said threshold level in response to both said means for counting the number of samples transmitted and said second counting means for registering the number of samples stored.

7. Apparatus as defined in claim 6 wherein said means for changing said threshold level includes means for deriving a figure of use for each buffer memory means, the figure of use being equal during any given instant to a decay factor times the sum of the number of samples transmitted from its corresponding buffer memory means during the last predetermined interval and the figure of use value during the last predetermined interval.

8. Apparatus as defined in claim 7 wherein said means for changing said threshold level further includes means for deriving an average figure of use and means for comparing each figure of use to the average figure use, a change in threshold level being indicated only when a figure of use differs by more than a predetermined amount from the average figure of use.

9. Asynchronous time division multiplexing apparatus in combination with a plurality of data compressors each of which reduces the redundancy in the samples transmitted from a video signal, frame memory means within each of said plurality of data compressors for storing an entire frame of video samples, means within each of said plurality of data compressors for comparing each new video sample with a previously stored video sample from said frame memory means to produce a difference signal, buffer memory means within each of said plurality of data compressors for storing samples to be transmitted, a counting means within each of said plurality of data compressors for registering the number of samples stored in said buffer memory means and for further registering the number of video frames to which these stored samples correspond, a threshold circuit means within each of said plurality of data compressors for writing said new video sample into its corresponding buffer memory means if said difference signal is determined to exceed a threshold level, said threshold level being a function of the number of samples stored in its corresponding buffer memory means, means for transmitting video samples, a time division multiplex switching means responsive to said counting means for selectively connecting the samples in the buffer memory means of said plurality of data compressors to said transmitting means, means for counting the number of samples transmitted from each of said plurality of data compressors within a predetermined interval, and means for changing said threshold level in response to said means for counting the number of samples transmitted.

10. Apparatus as defined in claim 9 wherein said means for changing said threshold level includes means for deriving a figure of use for each buffer memory means, the figure of use being equal during any given instant to a decay factor times the sum of the number of samples transmitted from its corresponding buffer memory means during the last predetermined interval and the figure of use value during the last predetermined interval.

11. Apparatus as defined in claim 10 wherein said means for changing said threshold level further includes means for deriving an average figure of use and means for comparing each figure of use to the average figure of use, a change in threshold level being indicated only when a figure of use differs by more than a predetermined amount from the average figure of use.